US008089188B2

(12) United States Patent
Thundat et al.

(10) Patent No.: US 8,089,188 B2
(45) Date of Patent: Jan. 3, 2012

(54) INTERNAL SPLIT FIELD GENERATOR

(75) Inventors: Thomas George Thundat, Knoxville, TN (US); Charles W. Van Neste, Kingston, TN (US); Arpad Alexander Vass, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 456 days.

(21) Appl. No.: 12/478,562

(22) Filed: Jun. 4, 2009

(65) Prior Publication Data

US 2010/0308676 A1    Dec. 9, 2010

(51) Int. Cl.
*H02K 21/00* (2006.01)
(52) U.S. Cl. ..................................... 310/152; 310/12.14
(58) Field of Classification Search ............... 310/12.14, 310/12.15, 152, 168, 171
See application file for complete search history.

(56) References Cited

U.S. PATENT DOCUMENTS

| | | | |
|---|---|---|---|
| 2,479,589 A * | 8/1949 | Parker | 310/211 |
| 3,135,880 A | 6/1964 | Olsen et al. | |
| 3,983,430 A * | 9/1976 | Howard | 310/155 |
| 4,031,457 A * | 6/1977 | Oberbeck | 323/362 |
| 4,132,911 A * | 1/1979 | Garron | 310/46 |
| 4,302,720 A * | 11/1981 | Brill | 324/146 |
| 4,850,821 A | 7/1989 | Sakai | |
| 5,245,238 A | 9/1993 | Lynch | |
| 5,347,186 A * | 9/1994 | Konotchick | 310/17 |
| 5,767,601 A | 6/1998 | Uchiyama | |
| 5,926,083 A * | 7/1999 | Asaoka | 336/110 |
| 6,043,632 A | 3/2000 | Maehara | |
| 6,087,750 A | 7/2000 | Raad | |
| 6,140,730 A * | 10/2000 | Tkaczyk et al. | 310/181 |
| 6,172,438 B1 | 1/2001 | Sakamoto | |
| 6,246,561 B1 | 6/2001 | Flynn | |
| 6,342,746 B1 | 1/2002 | Flynn | |
| 6,369,479 B1 | 4/2002 | Ochiai | |
| 6,518,681 B2 | 2/2003 | Ogino | |
| 6,707,226 B2 | 3/2004 | Umeda | |
| 6,778,056 B2 | 8/2004 | Ito et al. | |
| 6,891,294 B1 | 5/2005 | Deal | |
| 6,946,767 B2 | 9/2005 | Reardon | |
| 7,030,724 B2 | 4/2006 | Pedersen et al. | |
| 7,081,696 B2 | 7/2006 | Ritchey | |
| 7,116,028 B2 | 10/2006 | Ogino | |
| 7,327,061 B2 | 2/2008 | Rogala | |
| 7,400,069 B2 | 7/2008 | Kundel | |
| 2002/0135242 A1 | 9/2002 | Kawai | |
| 2004/0256938 A1 | 12/2004 | Reardon | |
| 2006/0202583 A1 | 9/2006 | Takeuchi | |
| 2006/0244327 A1 | 11/2006 | Kundel | |
| 2007/0090712 A1 | 4/2007 | Rogala | |
| 2007/0159011 A1 | 7/2007 | Terzian | |

OTHER PUBLICATIONS

Exro Technologies, Web page dated Jun. 1, 2009 obtained from www.exro.com/technologies.php.

(Continued)

*Primary Examiner* — Thanh Lam
(74) *Attorney, Agent, or Firm* — Brinks Hofer Gilson & Lione

(57) ABSTRACT

A generator includes a coil of conductive material. A stationary magnetic field source applies a stationary magnetic field to the coil. An internal magnetic field source is disposed within a cavity of the coil to apply a moving magnetic field to the coil. The stationary magnetic field interacts with the moving magnetic field to generate an electrical energy in the coil.

25 Claims, 7 Drawing Sheets

OTHER PUBLICATIONS

Chapter 16, Alternating-Current Generators and Transformers, Basic Electricity, Prepared by The Bureau of Naval Personnel, $2^{nd}$ Rev. Ed., 1970, Dover Publications, pp. 287-316.

Chapter 18, Direct-Current Generators, Basic Electricity, Prepared by The Bureau of Naval Personnel, $2^{nd}$ Rev. Ed., 1970, Dover Publications, pp. 338-366.

* cited by examiner

Half Rotation Waveform

Full Rotation Waveform

INTERNAL SPLIT FIELD GENERATOR

GOVERNMENT INTEREST

This application was made with United States government support under Contract No. DE-AC05-00OR22725 awarded by the United States Department of Energy. The United States Government has certain rights in these inventions.

RELATED APPLICATION

This application is related to U.S. patent application Ser. No. 12/478,429, filed Jun. 4, 2009 and titled "External Split Field Generator," which is incorporated by reference.

BACKGROUND

1. Technical Field

This application relates to devices that convert mechanical energy into electrical energy and, more particularly, to generating electrical energy through magnetic field interactions.

2. Related Art

A generator converts mechanical energy into electrical energy. Most generators include an armature and a magnetic field source. Electrical energy may be induced in a conductive member of the armature when there is a relative movement between the armature and a magnetic field. In some implementations, electrical energy may be generated at the armature by passing a moving magnetic field across a stationary armature. In these configurations, the armature would be the stator of the generator and the magnetic field source would be the rotor of the generator. In other implementations, the electrical energy may be generated at the armature by moving the armature through a stationary magnetic field. In these configurations, the magnetic field source would be the stator of the generator and the armature would be the rotor of the generator. When mechanical energy (e.g., a rotation force) is applied to the rotor of the generator, an electrical energy (e.g., current and voltage) may be induced in the armature. The induced electrical energy may then be output to power other electrical devices.

SUMMARY

A generator includes a coil of conductive material. A stationary magnetic field source applies a stationary magnetic field to the coil. An internal magnetic field source is disposed within a cavity of the coil to apply a moving magnetic field to the coil. The stationary magnetic field interacts with the moving magnetic field to generate an electrical energy in the coil.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE PREFERRED EMBODIMENTS

A generator may include an armature, a moving magnetic field source, and a stationary magnetic field source. Electrical energy may be induced in a conductive coil of the armature in response to an interaction between the armature, the moving magnetic field, and the stationary magnetic field. The moving magnetic field source may be positioned adjacent to a substantially neutral point of the conductive coil where the amount of flux from the moving magnetic field source would be balanced across both sides of the coil about equally. In this position, the moving magnetic field source alone may not induce much, if any, electrical energy in the coil. That result, however, may be substantially different when the stationary magnetic field is applied to the coil. The stationary magnetic field may be generated to pull magnetic flux from the moving magnetic field source back and forth across the coil as the polarity of the moving magnetic field alternates between north and south. When the moving magnetic field source is showing the coil a north polarity, more of the flux will be located in one side of the coil. When the moving magnetic field source is showing the coil a south polarity, more of the flux will be located in the other side of the coil. This flux interaction between the coil, the moving magnetic field, and the stationary magnetic field may result in an increased efficiency of the generator.

Figure 1:
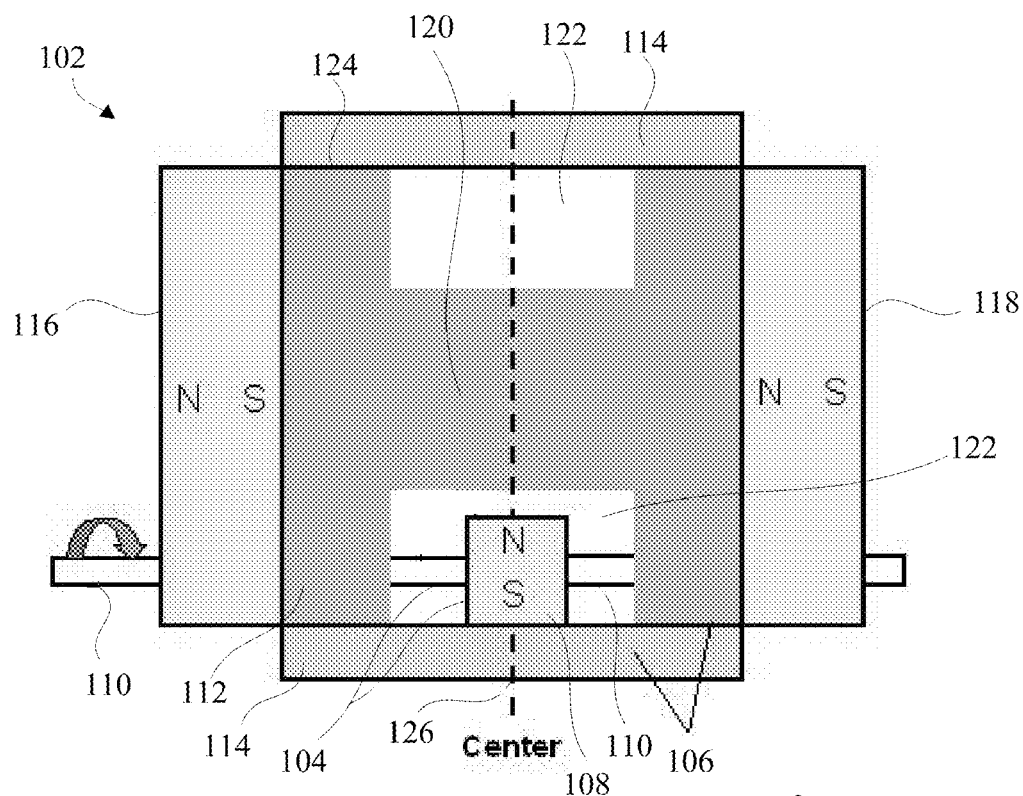
FIG. 1 is a side view of a generator.

FIG. 1 is a generator 102 that uses moving and stationary magnetic fields to generate electrical energy. The generator 102 includes an internal magnetic field source 104 and an armature 106. The internal magnetic field source 104 may generate a moving magnetic field that interacts with a stationary magnetic field to induce an electrical energy in the armature 106.

The internal magnetic field source 104 includes a magnet 108 and a shaft 110. The magnet 108 produces a moving magnetic field in the vicinity of the armature 106. In one implementation, the magnet 108 may be a permanent magnet with multiple poles. As the magnet 108 is rotated about the axis of the shaft 110, a conductive member of the armature 106 may experience an alternating polarity from the internal magnetic field source 104. The portion of the magnet 108 nearest to the conductive member of the armature 106 may alternate between being a north pole and a south pole. In one implementation, the magnet 108 may have one north pole and one south pole. Therefore, the armature 106 may experience two pole changes per full rotation of the shaft 110 (e.g., from north to south, and then from south back to north). Alternatively, the magnet 108 may have more than one north pole and more than one south pole. Therefore, the armature 106 may experience more than two pole changes per full rotation of the shaft 110. If the magnet 108 has two north poles alternating with two south poles, then the armature 106 may experience four pole changes per full rotation of the shaft 110. Other implementations of the magnet 108 may include any other number of poles to provide different numbers of pole changes per rotation of the shaft 110. In one such implementation, the magnet 108 may be a combination of multiple magnets that are arranged so that the same polarity is facing out all the way around the magnet 108. In this implementation, the pole changes experienced at the armature 106 may result from transitions between one pole, such as a north pole, to a magnetically neutral area of the magnet 108. Another transition would then occur when the magnetically neutral area transitions back to another north pole as the magnet 108 rotates.

In another implementation, the magnet 108 may comprise a field source coil. To generate a moving magnetic field, an alternating current may be applied to the field source coil. In this implementation, the alternating current excited coil generates a moving magnetic field without moving any mechanical parts. When the alternating current is flowing in one direction through the field source coil, the magnet 108 will have a first polarity. When the alternating current is flowing in the other direction through the field source coil, the magnet 108 will have the opposite polarity. In this configuration, the generator 102 may operate as a transformer.

The armature 106 includes a frame 112, a coil 114, a first stationary magnetic field source 116, and a second stationary magnetic field source 118. The coil 114 may be formed from a conducting material, such as a copper wire. The coil 114 may be disposed about the frame 112. In one implementation, the coil 114 may include one or more conductive windings wrapped around the frame 112.

The frame 112 may include a core 120, one or more cavities 122, and an outer surface 124. The coil 114 may be wound on the outer surface 124 of the frame 112 so that the coil 114 is wrapped about the core 120. The portion of the frame 112 that supports the coil 114 may be made of a non-conducting and non-magnetizing material, such as wood, plastic, or the like. The core 120 may be made from a magnetizing material, such as iron, steel, ferrous alloys, or the like.

The cavity 122 of the frame 112 provides a space for the internal magnetic field source 104 to generate a moving magnetic field near the coil 114. The internal magnetic field source 104 may be rotated about an axis inside the cavity 122. The axis may be the axis of the rotating shaft 110. The frame 112 may include a passageway that allows the rotating shaft 110 to reach the internal magnetic field source 104 in the cavity 122. The cavity 122 may be filled with a magnetizing material that at least partially surrounds the internal magnetic field source 104. The filler material may be placed around the internal magnetic field source 104 in a way that allows rotation of the internal magnetic field source 104.

The stationary magnetic field sources 116 and 118 may be substantially stationary relative to the coil 114. In one implementation, the stationary magnetic field sources 116 and 118 may be connected with the armature 106. Alternatively, the stationary magnetic field sources 116 and 118 may be an integral portion of the armature 106. The stationary magnetic field source 116 may be disposed on a first end portion of the frame 112 or core 120. In one implementation, the first end portion may be the outermost end of the frame 112 or core 120. In another implementation, the first end portion may be any portion of the frame 112 or core 120 located on that side of the coil 114. The stationary magnetic field source 116 may be located at a point to the left of the coil 114 (based on the perspective of FIG. 1). The stationary magnetic field source 118 may be disposed on a second end portion of the frame 112 or core 120. In one implementation, the second end portion may be the outermost portion of the frame 112 or core 120. In another implementation, the second end portion may be any portion of the frame 112 or core 120 located on that side of the coil 114. The stationary magnetic field source 118 may be located at a point to the right of the coil 114 (based on the perspective of FIG. 1).

The stationary magnetic field sources 116 and 118 may comprise permanent magnets or direct current energized elements, such as coils. The polarity of the stationary magnetic field source 116 is opposite the polarity of the stationary magnetic field source 118. The stationary magnetic field sources 116 and 118 are positioned to be attracted to each other. In FIG. 1, the south pole of the stationary magnetic field source 116 is closer to the coil 114 than the north pole of the stationary magnetic field source 116. The north pole of the stationary magnetic field source 118 is closer to the coil 114 than the south pole of the stationary magnetic field source 118. In this configuration, there is an attraction between the south pole of the stationary magnetic field source 116 and the north pole of the stationary magnetic field source 118. In other implementations, the north pole of the stationary magnetic field source 116 and the south pole of the stationary magnetic field source 118 may be facing the coil 114 to provide the attraction between the stationary magnetic field sources 116 and 118.

The stationary magnetic field sources 116 and 118 apply a stationary magnetic field to the coil 114. In one implementation, the stationary magnetic field sources 116 and 118 may apply a stationary magnetic field along a substantially longitudinal axis of the coil 114. When the stationary magnetic field sources 116 and 118 are disposed on the frame 112 that supports the coil 114, the magnetic field between the stationary magnetic field sources 116 and 118 passes along or through the core 120 of the frame 112. When the coil 114 is wound on the frame 112 about the core 120, the core 120 may define the longitudinal axis of the coil 114. Therefore, the stationary magnetic field may pass along the longitudinal axis of the coil 114 by passing along or through the core 120.

The magnetic strength and position of the stationary magnetic field sources 116 and 118 may be based on a desired electrical output of the armature 106. For example, the electrical output from the armature 106 may depend on the strength and position of the stationary magnetic field sources 116 and 118. The strength and position of the stationary magnetic field sources 116 and 118 may be set so that the stationary magnetic field is strong enough to sufficiently pull the magnetic flux from the internal magnetic field source 104 back and forth across the coil 114. If the stationary magnetic field sources 116 and 118 are far away or are weak, the stationary magnetic field may not be strong enough to sufficiently pull the magnetic flux from the internal magnetic field source 104 back and forth across the coil to induce electrical energy in the coil as the internal magnetic field source 104 alternates polarity. Alternatively, if the stationary magnetic field sources 116 and 118 are too strong or too close together, then the stationary magnetic field may interfere with the ability of the moving magnetic field from the internal magnetic field source 104 to interact as strongly with the coil 114. The optimal position and strength of the stationary magnetic field sources 116 and 118 may be based on the material used to form the core 120, the size of the coil 114, and/or the position of the internal magnetic field source 104 relative to the coil 114. The strength and position of the stationary magnetic field sources 116 and 118 may be adjusted until a desired output is achieved on the armature 106 based on the other selected components and attributes of the generator 102.

In one implementation of the generator 102, the stationary magnetic sources 116 and 118 may be N-42 Neodymium, ⅞ of an inch in diameter, ⅛ of an inch thick, and with a surface field of about 2885 Gauss (0.2885 Tesla). Alternatively, the surface field may be about 1000 Gauss to about 5000 Gauss, although the range may depend on the magnetic field spacing and the core material. The strength of the external magnetic field source 104 may be about 2500 Gauss (0.25 Tesla). The distance of the external magnetic field source 104 may be about 1 mm from the coil 114. Alternatively, the external magnetic field source 104 may be positioned to be closer or further away from the coil 114, such as up to several inches away from the coil 114. Any of these sizes, numbers, or measurements may be adjusted based on the intended application.

The internal magnetic field source 104 may be positioned adjacent to a substantially neutral point 126 of the coil 114. Depending on the shape of the coil 114, the internal magnetic field source 104 may be positioned substantially perpendicular to the substantially neutral point 126 of the coil 114. The substantially neutral point 126 may be the point in the coil 114 where the amount of flux from the internal magnetic field source 104 is balanced across both sides of the coil 114 about equally (without the interaction with the stationary magnetic field). If the internal magnetic field source 104 is located adjacent to the neutral point 126 of the coil 114, then the flux change from the internal magnetic field source 104 may produce a minimal induced electromagnetic force in the coil before addition of the stationary magnetic field from the stationary magnetic field sources 116 and 118. In this position, due to the balance across the coil, the moving magnetic field alone may not induce much, if any, electrical output from the coil 114. That result, however, may be substantially different when the stationary magnetic field is applied to the coil 114.

To identify the substantially neutral point 126 of the coil 114, the internal magnetic field source 104 may be placed adjacent to a first point on the inner side of the coil 114. The internal magnetic field source 104 may then be rotated to generate a moving magnetic field in the vicinity of the coil 114 before the stationary magnetic field is applied to the coil 114 (e.g., before stationary magnetic field sources 116 and 118 are placed on the armature 106 or other location). As the internal magnetic field source 104 rotates in the first chosen location, the output voltage from the armature 106 may be monitored. If the armature 106 is outputting little or no voltage as the internal magnetic field source 104 rotates at the first chosen location, then that location may be near the substantially neutral point 126 of the coil 114. If the armature 106 is transmitting a relatively large amount of voltage as the internal magnetic field source 104 rotates at the first chosen location, then that location may not be near the substantially neutral point 126 of the coil 114. In that situation, the internal magnetic field source 104 may be moved adjacent to a second point on the inside of the coil 114. The output voltage is measured with the internal magnetic field source 104 rotating at this new location. Once a position is determined for the internal magnetic field source 104 that results in little or no output voltage from the armature 106 (before the stationary magnetic field is applied to the coil 114), then that position may be identified as the substantially neutral point 126 of the coil 114.

When the internal magnetic field source 104 rotates at the neutral point 126 of the coil 114, no output voltage may result at the armature (before the stationary magnetic field is applied to the coil 114). In practice, however, some small amount of voltage may be transmitted from the armature 106 even if the neutral point 126 of the coil 114 is properly identified. Therefore, the neutral point 126 may include the absolute neutral point of the coil 114 as well as surrounding areas that may result in some small amount of voltage. The acceptable level of voltage induced when the internal magnetic field source 104 is at the neutral point 126 varies based on user defined tolerances as well as the desired strength of the output voltage. In one implementation, the neutral point may encompass several different possible positions for the internal magnetic field source 104 within an area around the absolute neutral point so that the output voltage, when the stationary magnetic sources 116 and 118 are not in place, would be about 5% of the output voltage that would occur when the stationary magnetic sources 116 and 118 are in place. In other implementations, other output voltage tolerance levels may be used, such as 20%, 10%, 1%, 0.1%, or the like.

In one implementation where the expected output voltage is about 4 volts when the stationary magnetic sources are in place, the output voltage when the stationary magnetic sources are removed may be in the range of about 5 mV (e.g., about 0.1% of the 4 volt expected output). However, the output voltage when the stationary magnetic sources are removed may be higher or lower than 5 mV, depending on the size and uniformity of the coil 114, and the acceptable positioning of the external magnetic field source 104 around the neutral point 126.

When the coil 114 is substantially uniform and symmetric (e.g., the individual windings of the coil 114 are uniformly distributed along the length of the coil 114), the substantially neutral point 126 of the coil 114 may comprise the center point of the coil along the length of the coil, as shown in FIG. 1. Therefore, the internal magnetic field source 104 may be placed substantially perpendicular to the center point of the coil 114. If the coil 114 is not substantially uniform or symmetric, then the substantially neutral point 126 may be offset from the center of the coil 114 (e.g., to the left or right).

Figure 2:
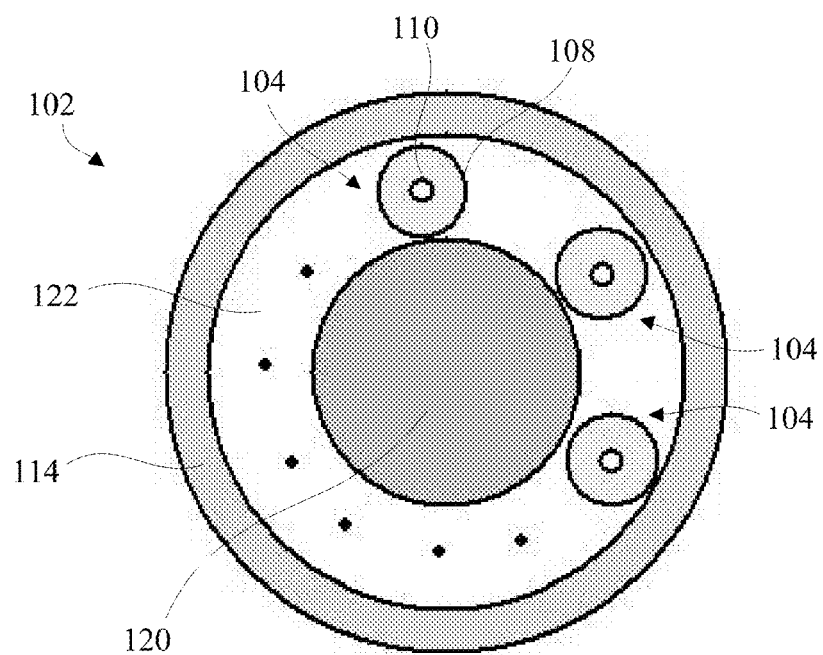
FIG. 2 is a cross-sectional view of the generator of FIG. 1.

FIG. 2 is a cross-sectional view of the generator 102 of FIG. 1 (e.g., a cross-sectional slice at the center line of FIG. 1). Multiple instances of the internal magnetic field source 104 may be aligned inside of one coil 114. The multiple internal magnetic field sources 104 may be disposed within one common cavity 122, as shown in FIG. 2. Alternatively, the multiple internal magnetic field sources 104 may be disposed within separate individually-sized cavities. By using multiple internal magnetic field sources 104 within the same coil 114, the flux change experienced at the coil 114 may be increased. By increasing the amount of flux change, the amount of voltage induced in the coil 114 may be increased.

A first instance of the internal magnetic field source 104 may apply a first moving magnetic field to the coil 114. A second instance of the internal magnetic field source 104 may apply a second moving magnetic field to the coil 114. The second internal magnetic source may be aligned relative to the coil 114 so that the polarity of the second internal magnetic field source experienced at the coil 114 substantially matches the polarity of the first internal magnetic field source. As the multiple internal magnetic field sources are rotated about their respective axes, each internal magnetic field source may show substantially the same polarity to the coil 114 at a given time. When the south pole of the first internal magnetic field source is nearest to the coil 114, the south pole of the second internal magnetic field source may also be nearest to the coil 114. As the internal magnetic field sources continue to rotate, the north pole of the first internal magnetic field source may be nearest to the coil 114 at the same time the north pole of the second internal magnetic field source is nearest to the coil 114.

FIGS. 3-8 show the effect of the internal magnetic field source 104 rotating near the coil 114. As the internal magnetic field source 104 rotates polarity, an interaction between the stationary magnetic field and the moving magnetic field may pull magnetic flux associated with the internal magnetic field source 104 back and forth across the coil 114. The coil 114 responds by opposing this change with a counter electromagnetic field. The stationary magnetic field sources 116 and 118 in FIGS. 3-8 are shown with an opposite polarity as compared to FIG. 1. In FIGS. 3-8, the north pole of the stationary magnetic field source 116 is closer to the coil 114 than the south pole of the stationary magnetic field source 116, and the south pole of the stationary magnetic field source 118 is closer to the coil 114 than the north pole of the stationary magnetic field source 118. Voltage plots 302, 402, 502, 602, 702, and 802 show the voltage levels at the output nodes of the coil 114 around the time frame that corresponds to the orientation of the internal magnetic field source 104 shown in the respective figures. The amplitude of the output voltages may be dependent on the strength of the stationary magnetic field sources 116 and 118 and the speed of rotation of the internal magnetic field source 104.

Figure 3:
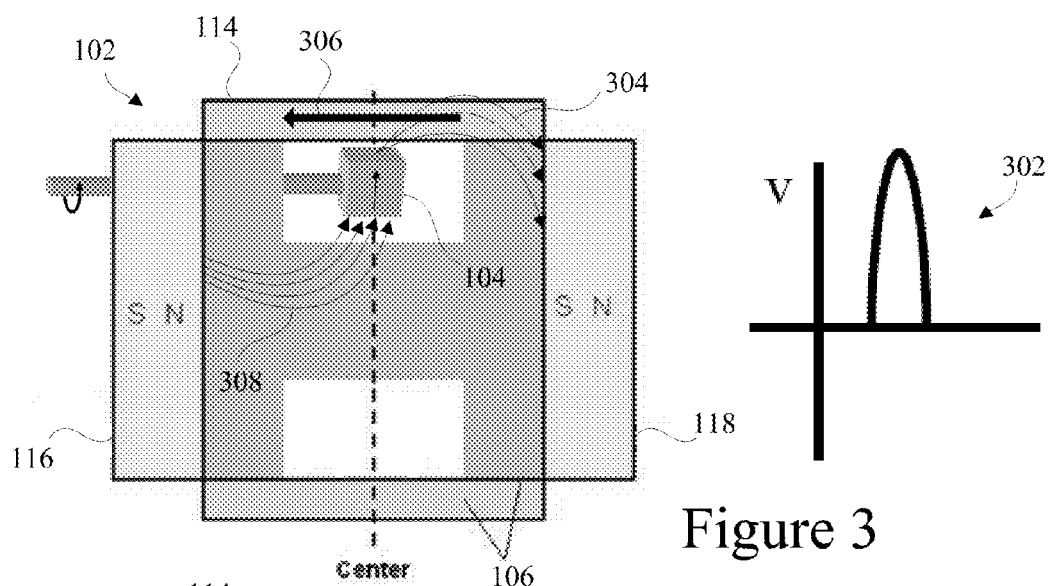
FIG. 3 shows a first result of a magnetic field source rotating near an armature of a generator.

In FIG. 3, the north pole of the field source 104 is moving towards the coil 114. As the north pole begins approaching the coil 114, magnetic flux 304 from the internal magnetic field source 104 will be attracted towards the stationary magnetic field source 118. Although some of the magnetic flux 304 may be experienced in the side portion of the coil 114 that is nearer to the stationary magnetic source 116, more of the magnetic flux 304 will be experienced in the side portion of the coil 114 that is nearer to the stationary magnetic source 118 when a north pole of the internal magnetic field source 104 is closer to the coil 114. The stationary magnetic field between the stationary magnetic field sources 116 and 118 pulls the magnetic flux 304 from the internal magnetic field source 104 across the portion of the coil 114 nearer to stationary magnetic field source 118. The magnetic flux 304 may be pulled in that direction because the magnetic flux 304 from the north pole of the internal magnetic field source 104 is attracted to the south pole of the stationary magnetic field source 118. Magnetic flux 308 may also pass between the stationary magnetic field source 116 and the internal magnetic field source 104. The magnetic flux 308 may pass through the core of frame that supports the coil 114.

The magnetic flux 304 that passes across the coil 114 induces a coil flux 306 through the coil 114. When the north pole of the internal magnetic field source 104 is approaching, the coil flux 306 will travel from the portion of the coil 114 near the stationary magnetic source 118 to the portion of the coil 114 near the stationary magnetic source 116. The interaction between the coil 114, the stationary magnetic field, and the moving magnetic field induces a current and voltage in the coil 114. The voltage level at the output nodes of the coil 114 is illustrated in the voltage plot 302. The induced voltage may increase from zero as the internal magnetic field source 104 rotates until a peak voltage is achieved. As the internal magnetic field source 104 continues to rotate, the induced voltage begins to decease towards zero again.

Figure 4:
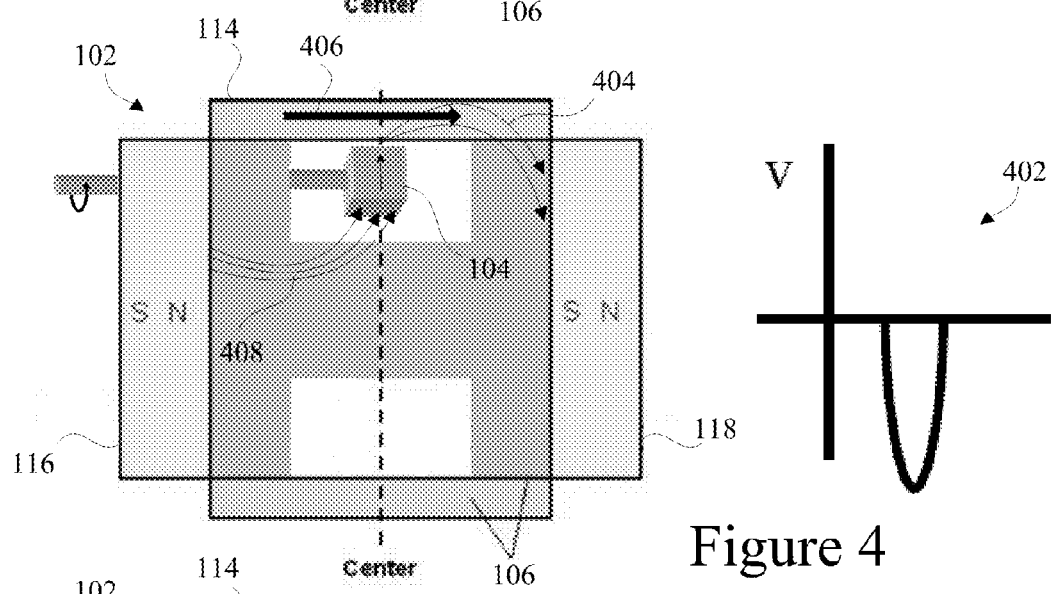
FIG. 4 shows a second result of a magnetic field source rotating near an armature of a generator.

In FIG. 4, the north pole of the field source 104 is moving away from the coil 114. As the north pole moves away from the coil 114, magnetic flux 404 from the internal magnetic field source 104 will be attracted towards the stationary magnetic field source 118. The stationary magnetic field between the stationary magnetic field sources 116 and 118 pulls the magnetic flux 404 from the internal magnetic field source 104 across the portion of the coil 114 nearer to stationary magnetic field source 118. The magnetic flux 404 may be pulled in that direction because the magnetic flux 404 from the north pole of the internal magnetic field source 104 is attracted to the south pole of the stationary magnetic field source 118. Magnetic flux 408 may also pass between the stationary magnetic field source 116 and the internal magnetic field source 104. The magnetic flux 408 may pass through the core of frame that supports the coil 114.

The magnetic flux 404 that passes across the coil 114 induces a coil flux 406 through the coil 114. When the north pole of the internal magnetic field source 104 is moving away from the armature 106, the coil flux 406 will travel from the portion of the coil 114 near the stationary magnetic source 116 to the portion of the coil 114 near the stationary magnetic source 118. The coil flux 406 when the north pole of the internal magnetic field source 104 is moving away from the armature 106 (e.g., FIG. 4) may be in the opposite direction as the coil flux 306 when the north pole of the internal magnetic field source 104 is approaching the armature 106 (e.g., FIG. 3). The interaction between the coil 114, the stationary magnetic field, and the moving magnetic field induces a current and voltage in the coil 114. The change in coil flux direction (compared to the direction in FIG. 3) results in a change in induced current direction and thus an output voltage with the opposite polarity. The voltage level at the output nodes of the coil 114 is shown in the voltage plot 402. The induced voltage may increase from zero (with an opposite polarity as compared to the voltage induced at FIG. 3) as the internal magnetic field source 104 rotates until a peak voltage is achieved. As the internal magnetic field source 104 continues to rotate, the induced voltage begins to decease and approach zero.

Figure 5:
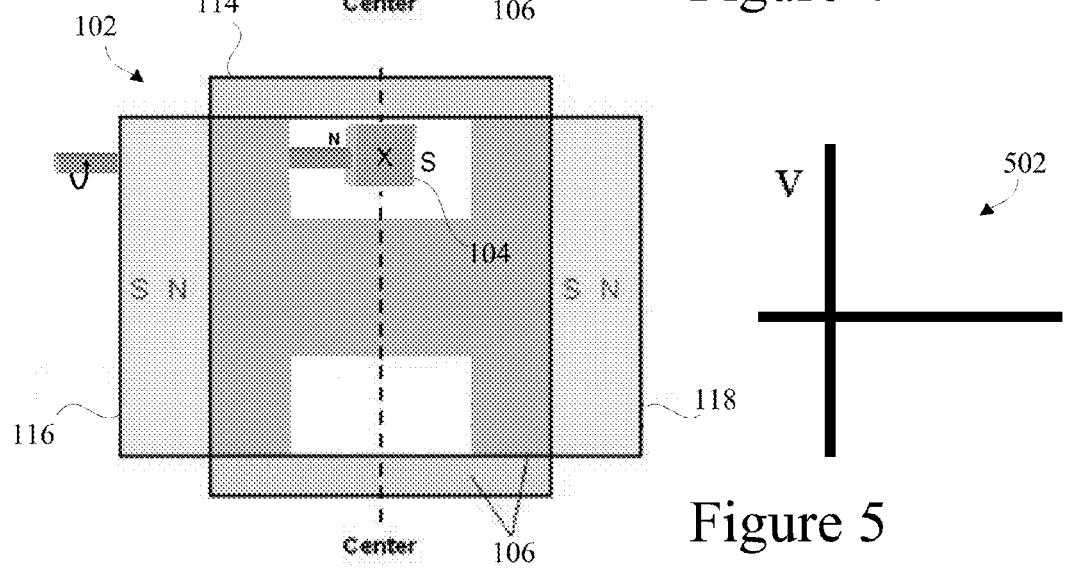
FIG. 5 shows a third result of a magnetic field source rotating near an armature of a generator.

In FIG. 5, the portion of the field source 104 that is closest to the coil 114 is neither a north pole nor a south pole. FIG. 5 shows the north pole of the field source 104 moved away from the coil 114. It is substantially equidistant from the coil as the south pole of the field source 104. When neither pole of the field source 104 is facing the coil 114, the voltage induced in the coil 114 may be near zero as shown in voltage plot 502. As the field source 104 continues rotating and begins to move the south pole of the field source 104 towards the coil 114, the voltage output from the coil 114 may move away from zero.

Figure 6:
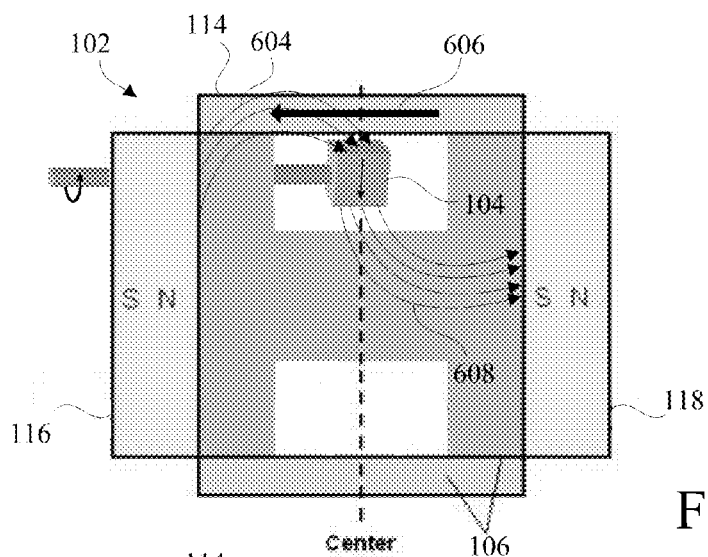
FIG. 6 shows a fourth result of a magnetic field source rotating near an armature of a generator.

In FIG. 6, the south pole of the field source 104 is shown moving towards the coil 114. As the south pole approaches the coil 114, magnetic flux 604 may pass between the internal magnetic field source 104 and the stationary magnetic field source 116. The magnetic flux 604 may pass from the stationary magnetic source 116 to the internal magnetic field source 104. Although some of the magnetic flux 604 may be experienced in the side portion of the coil 114 that is nearer to the stationary magnetic source 118, more of the magnetic flux 604 may be experienced in the side portion of the coil 114 that is nearer to the stationary magnetic source 116 when a south pole of the internal magnetic field source 104 is nearer to the coil 114. The stationary magnetic field between the stationary magnetic field sources 116 and 118 may pull the magnetic flux 604 across the portion of the coil 114 nearer to the stationary magnetic field source 116. The magnetic flux 604 may be pulled in that direction when the magnetic flux 604 from the north pole of the stationary magnetic field source 116 is attracted to the south pole of the internal magnetic field source 104. Magnetic flux 608 may also pass between the internal magnetic field source 104 and the stationary magnetic field source 118. The magnetic flux 608 may pass through the core of frame that supports the coil 114.

The magnetic flux 604 that passes across the coil 114 induces a coil flux 606 through the coil 114. When the south pole of the internal magnetic field source 104 is approaching and the magnetic flux 604 travels between the internal magnetic field source 104 and the stationary magnetic source 116, the coil flux 606 will travel from the portion of the coil 114 near the stationary magnetic source 118 to the portion of the coil 114 near the stationary magnetic source 116.

In FIGS. 3 and 6, the coil flux direction may be the same. When the north pole of the internal magnetic field source 104 is approaching the coil 114 (FIG. 3), the coil flux direction may be the same as when the south pole of the internal magnetic field source 104 is approaching the coil 114 (FIG. 6). The interaction between the coil 114, the stationary magnetic field, and the moving magnetic field induces a current and voltage in the coil 114. The voltage level at the output nodes of the coil 114 is shown in the voltage plot 602. In plots 302 and 602, the output voltage may be about the same (in magnitude and polarity) when either the north pole or the south pole of the internal magnetic field source 104 is approaching the armature 106. Alternatively, the output voltages of the two scenarios may be different based on other aspects of the generator 102, such as non-uniformities in magnetic source position or strength. As shown in the plot 602, the induced voltage may increase from zero as the internal magnetic field source 104 rotates until a peak voltage is achieved. As the internal magnetic field source 104 continues to rotate, the induced voltage begins to decease towards zero again.

Figure 7:
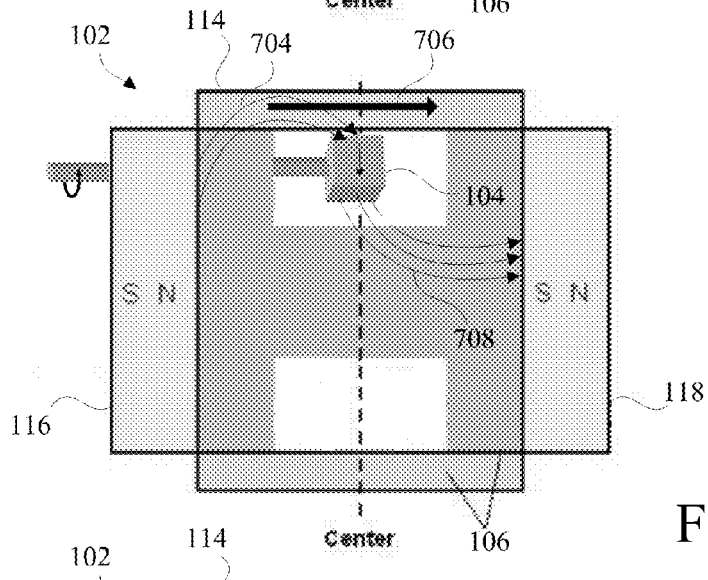
FIG. 7 shows a fifth result of a magnetic field source rotating near an armature of a generator.

In FIG. 7, the south pole of the field source 104 is shown moving away from the coil 114. As the south pole moves away from the coil 114, magnetic flux 704 may pass between the internal magnetic field source 104 and the stationary magnetic field source 116. The magnetic flux 704 may pass from the stationary magnetic source 116 to the internal magnetic field source 104. The stationary magnetic field between the stationary magnetic field sources 116 and 118 pulls the magnetic flux 704 across the portion of the coil 114 nearer to the stationary magnetic field source 116. The magnetic flux 704 may be pulled in that direction because the magnetic flux 704 from the north pole of the stationary magnetic field source 116 is attracted to the south pole of the internal magnetic field source 104. Magnetic flux 708 may also pass between the internal magnetic field source 104 and the stationary magnetic field source 118. The magnetic flux 708 may pass through the core of frame that supports the coil 114.

The magnetic flux 704 that passes across the coil 114 induces a coil flux 706 through the coil 114. When the south pole of the internal magnetic field source 104 is moving away from the armature, the coil flux 706 will travel from the portion of the coil 114 near the stationary magnetic source 116 to the portion of the coil 114 near the stationary magnetic source 118. The coil flux when the south pole of the internal magnetic field source 104 is moving away from the coil 114 (e.g., FIG. 7) may be in the opposite direction as the coil flux 606 when the south pole of the internal magnetic field source 104 was approaching the coil 114 (e.g., FIG. 6). The change in coil flux direction (compared to the direction in FIG. 6) results in a change in induced current direction and thus an output voltage with the opposite polarity.

In FIGS. 4 and 7, the coil flux direction may be the same. When the north pole of the internal magnetic field source 104 is moving away from the coil 114 (FIG. 4), the coil flux direction may be the same as when the south pole of the internal magnetic field source 104 is moving away from the coil 114 (FIG. 7). The interaction between the coil 114, the stationary magnetic field, and the moving magnetic field induces a current and voltage in the coil 114. The voltage level at the output nodes of the coil 114 is illustrated in the voltage plot 702. As shown in plots 402 and 702, the output voltage may be about the same (in magnitude and polarity) when either the north pole or the south pole of the internal magnetic field source 104 is moving away from the coil 114. Alternatively, the output voltages of the two scenarios may be different based on other aspects of the generator 102, such as non-uniformities in magnetic source position or strength. In plot 702, the induced voltage may increase from zero (with an opposite polarity as compared to the voltage induced at FIG. 6) as the internal magnetic field source 104 rotates until a peak voltage is achieved. As the internal magnetic field source 104 continues to rotate, the induced voltage begins to decease towards zero again.

Figure 8:
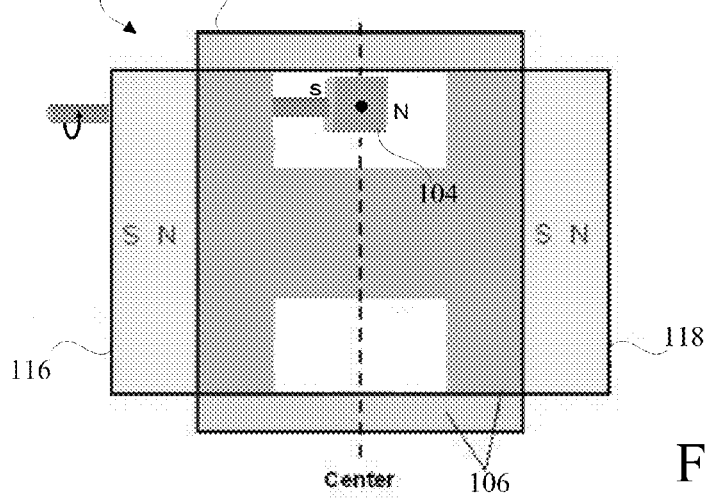
FIG. 8 shows a sixth result of a magnetic field source rotating near an armature of a generator.

In FIG. 8, the portion of the field source 104 that is closest to the coil 114 is neither a north pole nor a south pole. FIG. 8 shows the situation where the south pole of the field source 104 has moved away from the coil 114 and is substantially equidistant from the coil as the north pole of the field source 104. When neither pole of the field source 104 is facing the armature 106, the voltage induced in the coil 114 may be near zero. As the field source 104 continues rotating and begins to move the north pole of the field source 104 towards the coil 114, then the voltage output from the coil 114 will again move away from zero, as shown in FIG. 3.

FIGS. 3-8 illustrate a full rotation of the internal magnetic field source 104. The internal magnetic field source 104 includes a north pole and a south pole. Other implementations use an internal magnetic field source 104 with additional poles. Through the progression of FIGS. 3-8, the generator 102 may produce two flux changes at the coil 114 per pole of the internal magnetic field source 104 for each full rotation of the internal magnetic field source 104. Because the internal magnetic field source 104 of FIGS. 3-8 includes two poles, the generator 102 produces four flux changes per full rotation of the internal magnetic field source 104. A first flux change occurs in the time between FIGS. 3 and 4. FIG. 3 shows the coil flux 306 moving from right to left, and FIG. 4 shows the coil flux 406 moving from left to right. A second flux change occurs in the time between FIGS. 4 and 6. FIG. 4 shows the coil flux 406 moving from left to right, and FIG. 6 shows the coil flux 606 moving from right to left. A third flux change occurs in the time between FIGS. 6 and 7. FIG. 6 shows the coil flux 606 moving from right to left, and FIG. 7 shows the coil flux 706 moving from left to right. A fourth flux change occurs in the time between FIGS. 7 and 3. FIG. 7 shows the coil flux 706 moving from left to right, and FIG. 3 shows the coil flux 306 moving from right to left.

The two flux changes per pole of the internal magnetic field source 104 for each full rotation of the internal magnetic field source 104 results in an increase in frequency compared to a generator that produces only one flux change per pole of the internal magnetic field source 104 for each full rotation of the internal magnetic field source 104. This increase in frequency may increase the efficiency of the generator with higher power densities. Using the flux interaction between the moving and stationary magnetic fields to increase the generator frequency may result in higher generator efficiency without requiring additional field source poles or armature windings.

Other implementations, however, may use additional field source poles and/or armature windings to produce even higher generator efficiencies.

Figure 9:
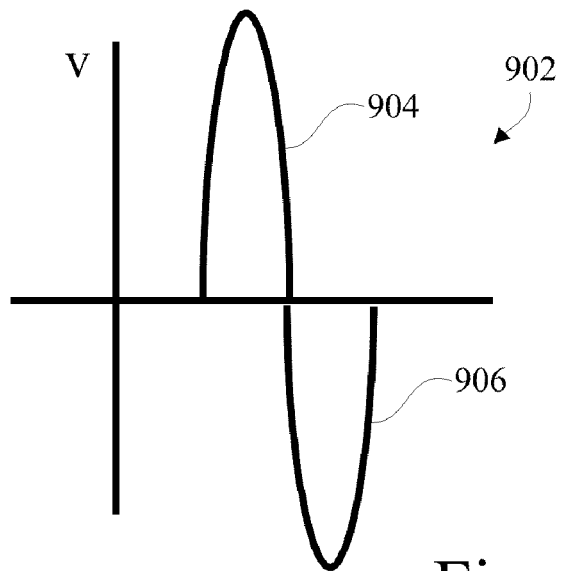
FIG. 9 is an output waveform of electrical energy induced in an armature of a generator in response to a half rotation of a magnetic field source.

FIG. 9 shows an output waveform 902 of electrical energy induced in the armature 106 of the generator 102 in response to a half rotation of the internal magnetic field source 104. The output waveform 902 may illustrate the voltage level that corresponds to the north pole of the internal magnetic field source 104 approaching the coil 114 (as shown in FIG. 3) and then moving away from the coil 114 (as shown in FIG. 4). Alternatively, the output waveform 902 may illustrate the voltage level that corresponds to the south pole of the internal magnetic field source 104 approaching the coil 114 (as shown in FIG. 6) and then moving away from the coil 114 (as shown in FIG. 7). The output waveform 902 may include peaks 904 and 906. In one implementation, the peak 904 may correspond to the north pole approaching the coil 114 and the peak 906 may correspond to the north pole moving away from the coil 114. In another implementation, the peak 904 may correspond to the south pole approaching the coil 114 and the peak 906 may correspond to the north south pole moving away from the coil 114. Alternatively, the peak 904 may correspond to the south pole moving away from the coil 114 and the peak 906 may correspond to the north pole approaching the coil 114. In other implementations, the peak 904 may correspond to the north pole moving away from the coil 114 and the peak 906 may correspond to the south pole approaching the coil 114.

Figure 10:
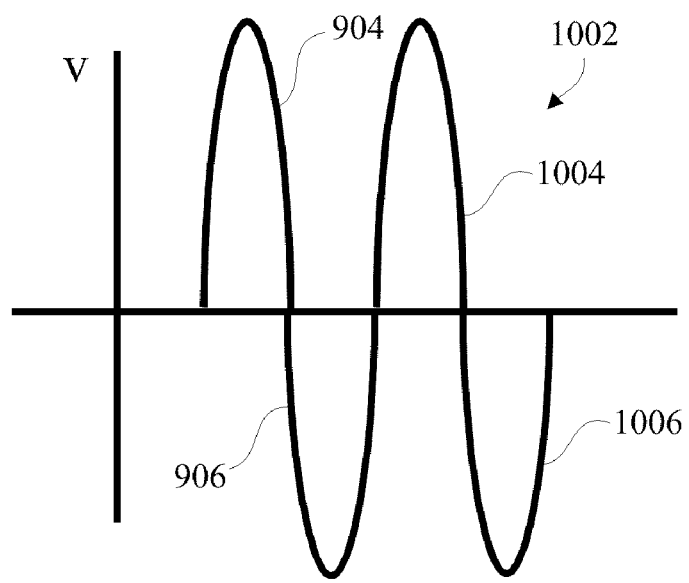
FIG. 10 is an output waveform of electrical energy induced in an armature of a generator in response to a full rotation of a magnetic field source.

FIG. 10 shows an output waveform 1002 of electrical energy induced in the armature 106 of the generator 102 in response to a full rotation of the internal magnetic field source 104. The output waveform 1002 includes the peaks 904 and 906 shown in FIG. 9 corresponding to a half rotation of the internal magnetic field source 104. The output waveform 1002 also includes peaks 1004 and 1006 to complete a full rotation of the internal magnetic field source 104. The four peaks 904, 906, 1004, and 1006 of alternating polarity represent the four flux changes per full rotation of an internal magnetic field source that has two poles.

If the peaks 904 and 906 correspond to the north pole of the internal magnetic field source 104 approaching and then moving away from the coil 114, then the peaks 1004 and 1006 may correspond to the south pole of the internal magnetic field source 104 approaching and then moving away from the coil 114. Alternatively, if the peaks 904 and 906 correspond to the south pole of the internal magnetic field source 104 approaching and then moving away from the coil 114, then the peaks 1004 and 1006 may correspond to the north pole of the internal magnetic field source 104 approaching and then moving away from the coil 114.

Figure 11:
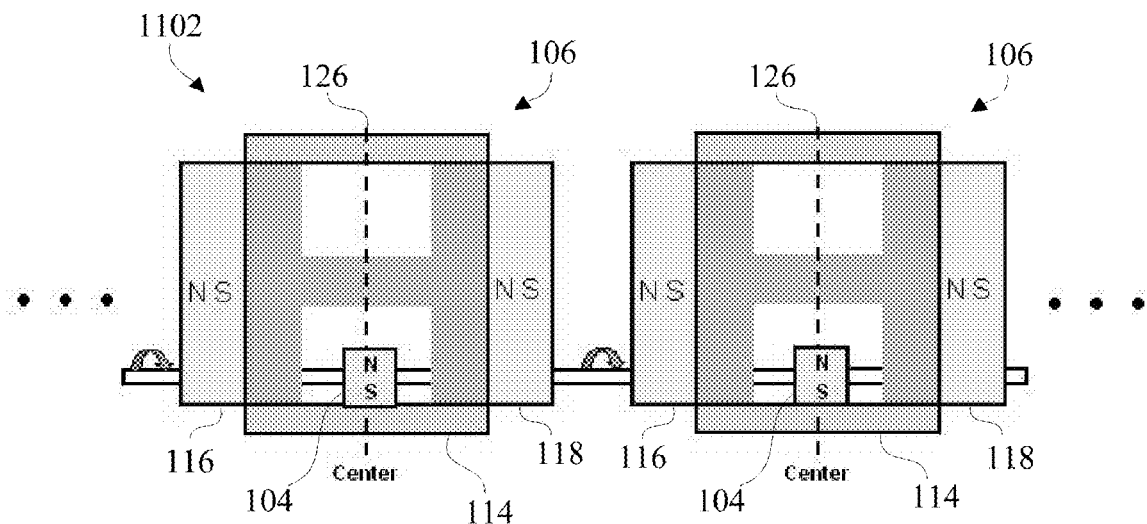
FIG. 11 shows a first generator with multiple armatures and multiple moving magnetic field sources.
Figure 12:
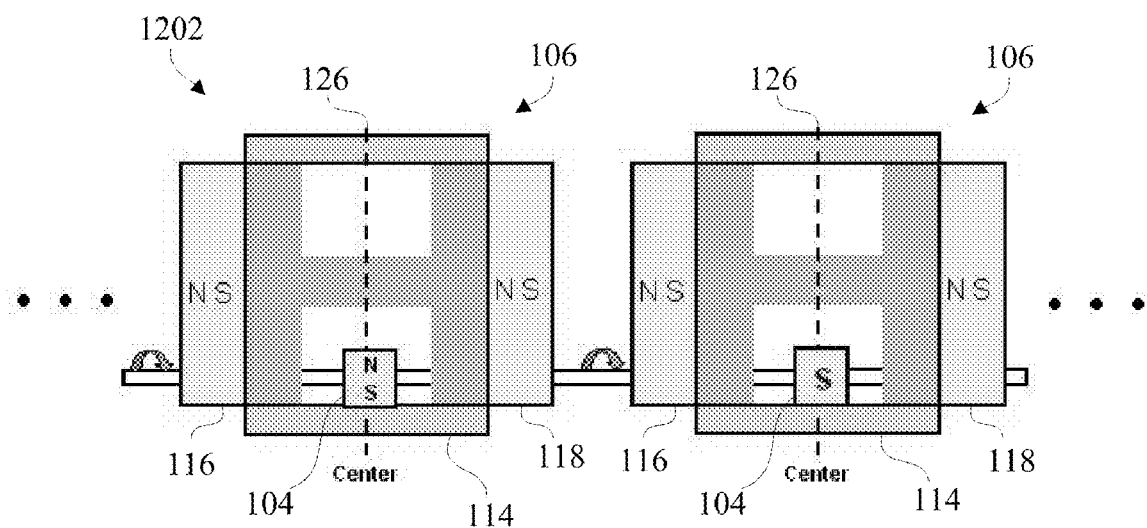
FIG. 12 shows a second generator with multiple armatures and multiple moving magnetic field sources.

FIGS. 11 and 12 show generators with multiple armatures and multiple magnetic field sources. In FIG. 11, the generator 1102 includes multiple instances of the internal magnetic field source 104 aligned with the respective neutral points 126 of multiple instances of the armature 106. The multiple armatures 106 may be separated by an amount of space so that their respective magnetic fields are isolated from each other. Alternatively, an isolation material (e.g., a ferrous or ferrite material) may be placed between the armatures 106 to isolate one armature from the other. The isolation material may be positioned so that there is a gap between the isolation material and the adjacent armatures. In one implementation, the stationary magnet of one armature is positioned in attraction with the adjacent stationary magnet of the other armature, as shown in FIGS. 11 and 12. In other implementations, the stationary magnet of one armature may be positioned to be in repulsion with the adjacent stationary magnet of the other armature. Positioning the stationary magnet of one armature to be in repulsion from the adjacent stationary magnet of the other armature may make it easier to isolate the adjacent armatures through separation by a ferrous/ferrite metal.

The multiple internal magnetic field sources 104 may be located on different rotating shafts or they may both be located on a single shaft. As the multiple internal magnetic field sources 104 rotate, the moving magnetic field interacts with the respective coils 114 and stationary magnetic fields to generate electrical energy in each of the coils 114.

In FIG. 12, the phase of one of the internal magnetic sources 104 of the generator 1202 is about 90° out of phase with the other of the internal magnetic sources 104. In one implementation, as shown in FIG. 12, the south pole of the left internal magnetic field source 104 may be facing a coil 114 when neither pole of the right internal magnetic field source 104 is directly facing a coil 114. When the internal magnetic field sources 104 turn about 90° together, the south pole of the right internal magnetic field source 104 may face a coil 114 when neither pole of the left internal magnetic field source 104 is directly facing a coil 114. This arrangement generates two current phases.

By staggering one of the internal magnetic sources 104 about 90° out of phase with the other of the internal magnetic sources 104, the amount of magnetic drag experienced as the internal magnetic sources 104 rotate may be reduced. As one of the internal magnetic field sources 104 is rotating away from a portion of the armature 106 (e.g., the core of the frame), another of the internal magnetic field sources 104 may be rotating towards the core of the armature 106. When an internal magnetic field source 104 is rotating away from the core of the armature 106, there may be an attraction force between the internal magnetic field source 104 and the core. That attraction force may make it more difficult to turn the shaft that supports the internal magnetic field source 104. When an internal magnetic field source 104 is rotating toward the core of the armature 106, there may also be an attraction force between the internal magnetic field source 104 and the core. The attraction force between the internal magnetic field source 104 moving towards the core of its associated armature 106 may counteract at least some of the attraction force between the internal magnetic field source 104 moving away from the core of its associated armature 106. Therefore, the multiple phase system of the generator 1202 may reduce the amount of mechanical energy required to turn the shaft.

Figure 13:
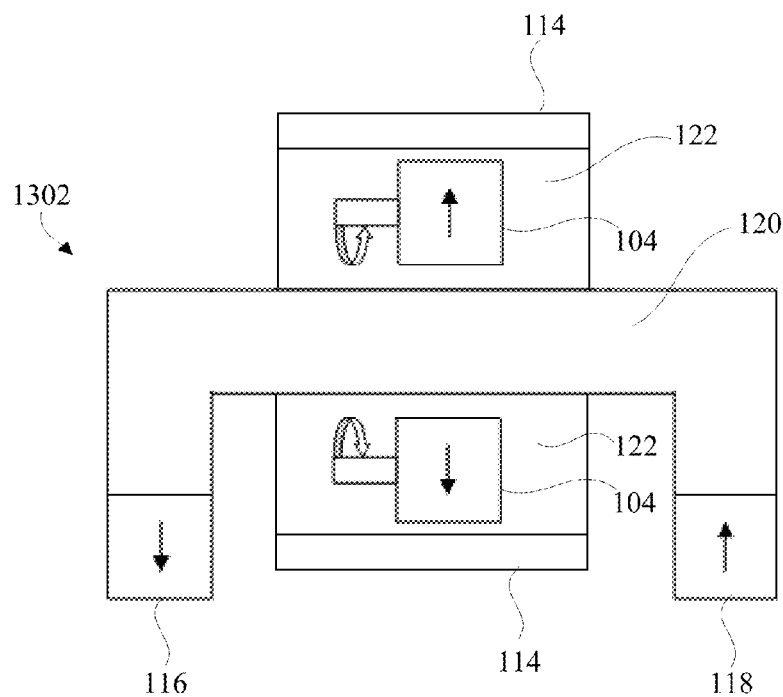
FIG. 13 shows one configuration for stationary magnetic field sources of a generator.
Figure 14:
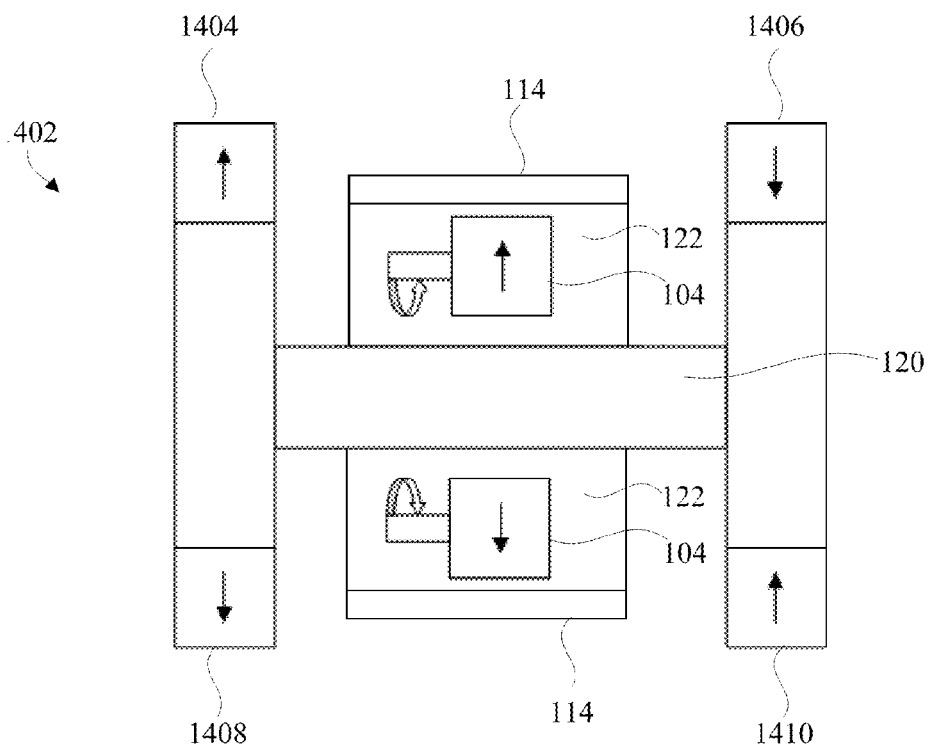
FIG. 14 shows a second configuration for stationary magnetic field sources of a generator.
Figure 15:
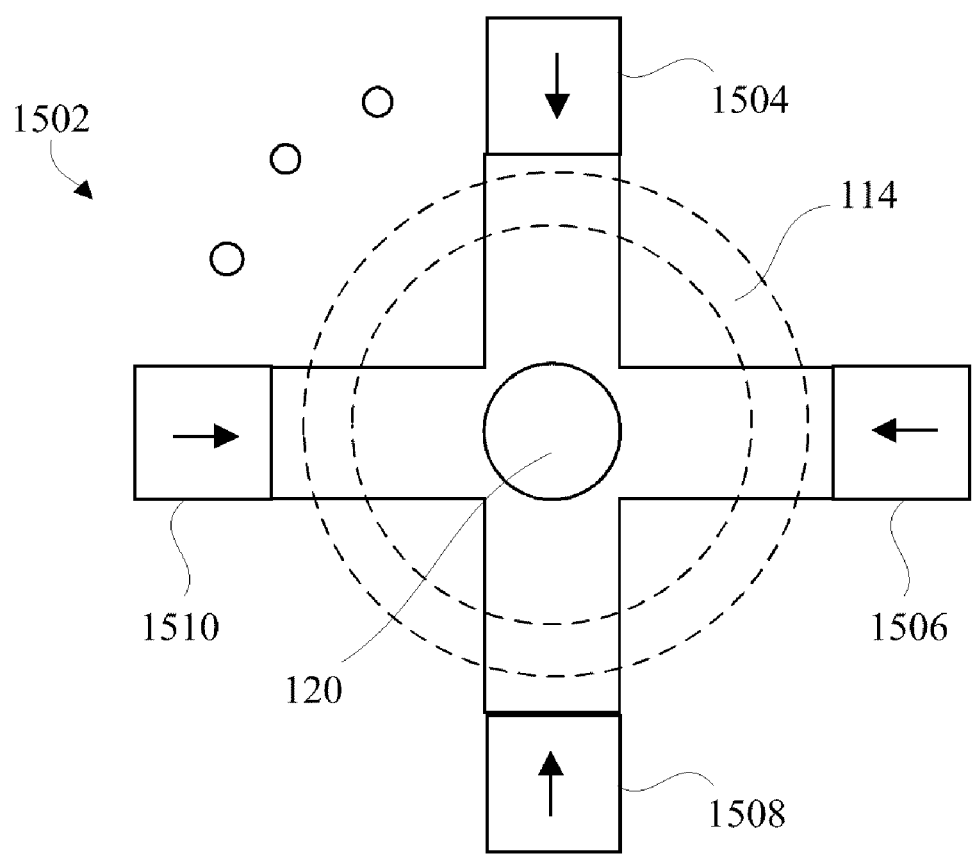
FIG. 15 shows a third configuration for stationary magnetic field sources of a generator.

FIGS. 13-15 show other configurations for the stationary magnetic field sources of a generator. In FIG. 13, the generator 1302 includes stationary magnetic field sources 116 and 118 disposed on the ends of a bent core 120 (e.g., horseshoe shaped).

FIG. 14 shows a generator 1402 with a coil 114 wrapped about a core 120 that may carry multiple stationary magnetic fields along the axis of the coil 114. A first stationary magnetic field may pass between the stationary magnetic field sources 1404 and 1406 through the core 120. A second stationary magnetic field may pass between the stationary magnetic field sources 1408 and 1410 through the core 120. Additional stationary magnetic sources may also be positioned to pass additional stationary magnetic fields through the core 120.

FIG. 15 shows an end view of a generator 1502 that includes four or more stationary magnetic fields passing through a core 120 of an armature. A first magnetic field passes through the core 120 between the stationary magnetic field source 1504 and another stationary magnetic field source that is not visible in this perspective. A second magnetic field passes through the core 120 between the stationary magnetic field source 1506 and another stationary magnetic field source that is not visible in this perspective. A third magnetic field passes through the core 120 between the stationary magnetic field source 1508 and another stationary magnetic field source that is not visible in this perspective. A fourth magnetic field passes through the core 120 between the stationary magnetic field source 1510 and another stationary magnetic field source that is not visible in this perspective. The other stationary magnetic sources that are not visible in this perspective may be disposed on the other end of a bent core 120 (e.g., a horseshoe shaped core). These other magnetic field sources may be directly below the stationary magnetic field sources 1504, 1506, 1508, and 1510 in the perspective of FIG. 15. Furthermore, additional stationary magnetic sources (e.g., more than the four shown) may also be positioned to pass additional stationary magnetic fields through the core 120.

The term "coupled" may encompass both direct and indirect coupling. Thus, first and second parts are said to be coupled together when they directly contact one another, as well as when the first part couples to an intermediate part which couples either directly or via one or more additional intermediate parts to the second part. The term "position," "location," or "point" may encompass a range of positions, locations, or points.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A generator, comprising:
   a frame that defines a cavity and an outer surface;
   a coil disposed about the outer surface of the frame;
   an internal magnetic field source disposed within the cavity of the frame and configured to apply a moving magnetic field to the coil; and
   a stationary magnetic field source configured to apply a stationary magnetic field to the coil, wherein the stationary magnetic field interacts with the moving magnetic field to generate an electrical energy in the coil.

2. The generator of claim 1, wherein the internal magnetic field source is located adjacent to a substantially neutral point of the coil where flux change from the internal magnetic field source would produce a minimal amount of induced electromagnetic force in the coil before addition of the stationary magnetic field.

3. The generator of claim 2, wherein the internal magnetic field source generates the moving magnetic field when rotated about an axis in a position adjacent to the substantially neutral point of the coil, and wherein a north pole of the internal magnetic field source and a south pole of the internal magnetic field source alternate being nearer to the coil as the internal magnetic field source rotates about the axis.

4. The generator of claim 1, wherein the frame comprises a core made of a magnetizing material, wherein the coil is wound on the frame about the core, and wherein the stationary magnetic field source is coupled with the core to apply the stationary magnetic field along or through the core.

5. The generator of claim 4, further comprising a second stationary magnetic field source, wherein the stationary magnetic field source is coupled with a first end portion of the core, wherein the second stationary magnetic field source is coupled with a second end portion of the core, wherein the stationary magnetic field source and the second stationary magnetic field source are positioned in attraction to each other.

6. The generator of claim 4, wherein a portion of the frame that supports the coil is made of a non-conducting and non-magnetizing material.

7. The generator of claim 1, wherein the cavity of the frame is at least partially filled with a magnetizing material that at least partially surrounds the internal magnetic field source.

8. The generator of claim 1, wherein the coil comprises a conductive material wound about the core in a substantially uniform winding pattern, and wherein the internal magnetic field source is adjacent to a longitudinal center point of the coil.

9. The generator of claim 1, wherein an interaction between the coil, the stationary magnetic field, and the moving magnetic field produces two flux changes at the coil per pole of the internal magnetic field source for each full rotation of the internal magnetic field source.

10. The generator of claim 1, wherein the stationary magnetic field source serves to pull magnetic flux associated with the internal magnetic field source back and forth across the coil as a polarity of the internal magnetic field source experienced at the coil alternates between north and south.

11. The generator of claim 10, wherein more of the magnetic flux associated with the internal magnetic field source is experienced in a first side portion of the coil than in a second side portion of the coil when a north pole of the internal magnetic field source is nearer to the coil, and wherein more of the magnetic flux associated with the internal magnetic field source is experienced in the second side portion of the coil than in the first side portion of the coil when a south pole of the internal magnetic field source is nearer to the coil.

12. The generator of claim 1, further comprising a second internal magnetic field source disposed within a cavity of the frame and configured to apply a second moving magnetic field to the coil.

13. The generator of claim 12, wherein the second internal magnetic field source is aligned relative to the coil so that a polarity of the second internal magnetic field source experienced at the coil substantially matches a polarity of the internal magnetic field source as the internal magnetic field sources are rotated about their respective axes.

14. The generator of claim 1, wherein the frame, the coil, and the stationary magnetic field source make up a first armature of the generator, the generator further comprising:
   a second armature including a coil and a second stationary magnetic field source, wherein the second stationary magnetic field source applies a second stationary magnetic field to the coil of the second armature; and
   a second internal magnetic field source disposed within a cavity of the coil and configured to apply a second moving magnetic field to the coil of the second armature, wherein the second stationary magnetic field interacts with the second moving magnetic field to generate an electrical energy in the coil of the second armature.

15. The generator of claim 14, wherein the internal magnetic field source and the second internal magnetic field source are coupled with a rotating shaft, and wherein a polarity of the internal magnetic field source is about ninety degrees out of phase with a polarity of the second internal magnetic field source.

16. A generator, comprising:
   a core;
   a coil disposed about the core;
   a first stationary magnetic field source disposed on a first end portion of the core;

a second stationary magnetic field source disposed on a second end portion of core, wherein the first and second stationary magnetic field sources are configured to apply a stationary magnetic field to the coil; and an internal magnetic field source disposed within a cavity of the coil and configured to apply a moving magnetic field to the coil.

17. The generator of claim 16, wherein the coil comprises an armature winding that conducts electrical energy generated in response to an interaction between the coil, the moving magnetic field, and the stationary magnetic field.

18. The generator of claim 16, wherein the internal magnetic field source is located adjacent to a substantially neutral point of the coil where flux change from the internal magnetic field source would produce a minimal amount of induced electromagnetic force in the coil before addition of the stationary magnetic field;

wherein the internal magnetic field source generates the moving magnetic field when rotated about an axis in a position adjacent to the substantially neutral point of the coil; and wherein a north pole of the internal magnetic field source and a south pole of the internal magnetic field source alternate being nearer to the coil as the internal magnetic field source rotates about the axis.

19. The generator of claim 16, wherein the first and second stationary magnetic field sources apply the stationary magnetic field along or through the core; and wherein the first and second stationary magnetic field sources serve to pull magnetic flux associated with the internal magnetic field source back and forth across the coil as a polarity of the internal magnetic field source experienced at the coil alternates between north and south.

20. A generator, comprising:

a coil of conductive material;

a stationary magnetic field source configured to apply a stationary magnetic field substantially along a longitudinal axis of the coil; and an internal magnetic field source disposed within a cavity of the coil and configured to apply a moving magnetic field to the coil, wherein the stationary magnetic field source causes magnetic flux associated with the internal magnetic field source to be alternatively attracted towards a first side portion of the coil or a second side portion of the coil based on a polarity of the internal magnetic field source.

21. The generator of claim 20, wherein the internal magnetic field source is located adjacent to a substantially neutral point of the coil where flux change from the internal magnetic field source would produce a minimal amount of induced electromagnetic force in the coil before addition of the stationary magnetic field;

wherein the internal magnetic field source generates the moving magnetic field when rotated about an axis in a position adjacent to the substantially neutral point of the coil; and wherein a north pole of the internal magnetic field source and a south pole of the internal magnetic field source alternate being nearer to the coil as the internal magnetic field source rotates about the axis.

22. A method of generating electrical energy, comprising:

positioning an internal magnetic field source within a cavity of a coil of conductive material at a location where the internal magnetic field source is adjacent to a substantially neutral point of the coil;

applying a stationary magnetic field along a longitudinal axis of the coil; and alternating a polarity of the internal magnetic field source, wherein the stationary magnetic field causes magnetic flux associated with the internal magnetic field source to be alternatively attracted towards a first side portion of the coil or a second side portion of the coil based on a polarity of the internal magnetic field source.

23. The method of claim 22, wherein the internal magnetic field source comprises a magnet with multiple poles, and wherein the step of alternating the polarity comprises rotating a shaft coupled with the internal magnetic field source.

24. The method of claim 22, wherein the coil is disposed about a core, wherein the step of applying the stationary magnetic field comprises:

positioning a first stationary magnetic field source on a first end portion of the core; and positioning a second stationary magnetic field source on a second end portion of the core so that the second stationary magnetic field source is in attraction with the first stationary magnetic field source.

25. The method of claim 22, wherein the step of positioning the internal magnetic field source comprises identifying the substantially neutral point of the coil where flux change from the internal magnetic field source would produce a minimal amount of induced electromagnetic force in the coil before the stationary magnetic field is applied to the coil.

\* \* \* \* \*